(12) United States Patent
Sansalone (10) Patent No.: US 7,575,393 B2
(45) Date of Patent: Aug. 18, 2009

(54) CEMENTITIOUS POROUS PAVEMENT

(75) Inventor: John J. Sansalone, Baton Rouge, LA (US)

(73) Assignee: Unit Process Technologies, LLC, Gainesville, FL (US)

(*) Notice: Subject to any disclaimer, the term of this patent is extended or adjusted under 35 U.S.C. 154(b) by 0 days.

(21) Appl. No.: 10/842,328

(22) Filed: May 10, 2004

(65) Prior Publication Data
US 2004/0208697 A1 Oct. 21, 2004

Related U.S. Application Data

(62) Division of application No. 09/916,171, filed on Jul. 26, 2001, now Pat. No. 6,767,160, which is a division of application No. 09/714,366, filed on Nov. 16, 2000, now Pat. No. 6,468,942.

(51) Int. Cl.
*E01C 9/00* (2006.01)
(52) U.S. Cl. ..................................... 404/71
(58) Field of Classification Search ............ 404/2, 404/17, 27, 31, 71; 405/52
See application file for complete search history.

(56) References Cited

U.S. PATENT DOCUMENTS

| | | | |
|---|---|---|---|
| 775,791 A | 11/1904 | Austin | |
| 1,351,607 A * | 8/1920 | Barrett et al. .................. 238/5 |
| 1,906,494 A | 5/1933 | Steward | |
| 2,773,777 A * | 12/1956 | Alexander et al. ........... 106/648 |
| 3,418,249 A | 12/1968 | Pitchford .................. 252/311.5 |
| 3,499,837 A | 3/1970 | Jaunarajs ...................... 210/59 |
| 3,615,798 A | 10/1971 | Woodruff .................... 106/277 |
| 3,632,418 A | 1/1972 | Draper ................. 117/138.8 E |
| 3,645,177 A | 2/1972 | Hargett ........................... 94/33 |
| 3,687,021 A | 8/1972 | Hensley ........................... 94/9 |
| 3,690,227 A | 9/1972 | Welty ............................. 94/33 |
| 3,707,901 A * | 1/1973 | Bynum et al. ................ 404/71 |
| 3,740,201 A | 6/1973 | Woodruff .................... 260/29.7 |
| 3,765,783 A | 10/1973 | Wager .......................... 404/2 |
| 3,817,643 A | 6/1974 | Azar et al. .................... 404/76 |
| 3,870,422 A | 3/1975 | Medico, Jr. .................. 404/31 |
| 3,884,849 A | 5/1975 | Molbert ..................... 521/124 |
| 4,049,874 A | 9/1977 | Aoyama et al. ............. 428/451 |
| 4,116,709 A * | 9/1978 | La Bate ...................... 106/284 |
| 4,155,654 A | 5/1979 | Kennepohl et al. ............ 366/16 |
| 4,167,356 A * | 9/1979 | Constantinescu ............ 404/31 |
| 4,174,912 A * | 11/1979 | Peterson ...................... 404/27 |
| 4,188,232 A * | 2/1980 | Hall et al. .................... 106/644 |
| 4,244,747 A * | 1/1981 | Leonard et al. ............. 106/271 |
| 4,245,026 A | 1/1981 | Ziolo ....................... 430/137.1 |
| 4,551,254 A | 11/1985 | Imada et al. ................ 210/688 |
| 4,560,620 A | 12/1985 | Arai ........................... 428/565 |
| 4,629,757 A | 12/1986 | Esser et al. ................. 524/457 |

(Continued)

OTHER PUBLICATIONS

*Declaration of Experimental Use by John J. Sansalone*; Apr. 23, 2001.

(Continued)

*Primary Examiner*—Gary S Hartmann
(74) *Attorney, Agent, or Firm*—Jones, Walker, Waechter, Poitevent, Carrere & Denegre, L.L.P.

(57) ABSTRACT

A cementitious porous pavement comprising a hydraulic conductivity greater than about 0.0001 cm/sec and a depth of at least three inches.

22 Claims, 4 Drawing Sheets

U.S. PATENT DOCUMENTS

| | | | | |
|---|---|---|---|---|
| 4,666,988 | A | 5/1987 | Neill et al. | 525/196 |
| 4,708,516 | A | 11/1987 | Miller | 404/31 |
| 4,801,332 | A * | 1/1989 | Selfridge et al. | 106/273.1 |
| 4,915,539 | A * | 4/1990 | Yoshikane et al. | 404/31 |
| 4,986,693 | A | 1/1991 | Salberg et al. | 404/4 |
| 5,286,412 | A * | 2/1994 | Downs et al. | 264/112 |
| 5,298,328 | A | 3/1994 | Abe et al. | 428/403 |
| 5,369,072 | A | 11/1994 | Change et al. | 502/84 |
| 5,374,672 | A | 12/1994 | Chaverot et al. | 524/60 |
| 5,405,213 | A | 4/1995 | O'Connor | 404/77 |
| 5,431,510 | A | 7/1995 | Reinert | 404/72 |
| 5,456,553 | A * | 10/1995 | Ii et al. | 405/263 |
| 5,466,407 | A * | 11/1995 | Downs et al. | 264/115 |
| 5,558,702 | A | 9/1996 | Chatterjce et al. | 106/277 |
| 5,665,241 | A | 9/1997 | Maeda et al. | 210/683 |
| 5,676,488 | A | 10/1997 | Hedblom | 404/9 |
| 5,788,407 | A * | 8/1998 | Hwang | 404/81 |
| 5,803,662 | A | 9/1998 | Gunter | 405/119 |
| 5,810,510 | A | 9/1998 | Urriola | 405/45 |
| 5,853,846 | A | 12/1998 | Clark et al. | 428/131 |
| 5,855,790 | A | 1/1999 | Bradbury et al. | 210/676 |
| 5,906,454 | A | 5/1999 | Medico, Jr. et al. | 404/32 |
| 5,928,418 | A | 7/1999 | Tamaki et al. | 106/277 |
| 5,980,843 | A | 11/1999 | Silversand | 423/210 |
| 5,989,417 | A | 11/1999 | Fleischhacker | 210/163 |
| 6,102,613 | A | 8/2000 | Medico, Jr. et al. | 404/17 |
| 6,113,978 | A | 9/2000 | Ornstein et al. | 427/136 |
| 6,114,418 | A | 9/2000 | Isobe et al. | 524/64 |
| 6,146,051 | A | 11/2000 | Pratt | 404/2 |
| 6,206,607 | B1 | 3/2001 | Medico, Jr. et al. | 404/2 |
| 6,217,252 | B1 | 4/2001 | Tollier et al. | 404/77 |
| 6,293,065 | B1 * | 9/2001 | Suzuki et al. | 52/315 |
| 6,468,678 | B1 | 10/2002 | Dahlin et al. | 428/692 |
| 6,468,942 | B1 | 10/2002 | Sansalone | |
| 6,767,160 | B2 | 7/2004 | Sansalone | |
| 6,960,046 | B2 * | 11/2005 | Kang | 404/44 |
| 7,341,661 | B2 | 3/2008 | Sansalone | |
| 2004/0208697 | A1 | 10/2004 | Sansalone | |
| 2008/0023383 | A1 | 1/2008 | Sansalone | |

OTHER PUBLICATIONS

American Water Works Association Journal, vol. 86, No. 8; Aug. 1994; *Effect of Iron Oxide Coating on Sand Filtration*; V. Susie Stenkamp and Mark M. Benjamin; pp. 37-51.

Wat. Sci. Tech. vol. 32, No. 1; 1995; *An Infiltration Device as a Best Management Practice for Immobilizing Heavy Metals in Urban Highway Runoff*; J.J. Sansalone and S.G. Buchberger; pp. 119-125.

Transportation Research Record 1483; 1995; *Correlations Between Heavy Metals and Suspended Solids in Highway Runoff; Implications for Control Strategies*; John J. Sansalone, Steven G. Buchberger, and Margarete T. Koechling; pp. 112-119.

1996; Cincinnati, Ohio; *Adsorptive Infiltration by Oxide Coated Sand Media for Immobilizing Metal Elements in Runoff*; John Joseph Sansalone.

The Science of the Total Environment, 189/190; 1996; *Fractionation of Heavy Metals in Pavement Runoff*; John J. Sansalone, Steven G. Buchberger, and Souhail R. Al-Abed; pp. 371-378.

Transportation Research Record 1523; 1996; *Characterization of Metals and Solids in Urban Highway Winter Snow and Spring Rainfall-Runoff*; John J. Sansalone and Steven G. Buchberger; pp. 147-159.

Wat. Sci. Tech. vol. 36, No. 8-9, 1997; *Characterization of Solid and Metal Element Distributions in Urban Highway Stormwater*; John J. Sansalone and Steven G. Buchberger; pp. 155-160.

Journal of Environmental Engineering; Feb. 1997; *Partitioning and First Flush of Metals in Urban Roadway Storm Water*; John J. Sansalone and Steven G. Buchberger; pp. 134-143.

Journal of Environmental Engineering; Jul. 1997; *Method for Coating Filter Media with Synthetic Manganese Oxide*; Peter B. Merkle, William R. Knocke, and Daniel L. Gallagher; pp. 642-649.

Transportation Research Record 1601; Nov. 1997; *Relationship Between Particle Size Distribution and Specific Surface Area of Urban Roadway Stormwater Solids*; John J. Sansalone, Steven G. Buchberger, Joseph M. Koran, and Joseph A. Smithson; pp. 95-108.

Journal of Environmental Engineering; May 1998; *Physical Characteristics of Urban Roadway Solids Transported During Rain Events*; John J. Sansalone, Joseph M. Koran, Joseph A. Smtihson; and Steven G. Buchberger; pp. 427-440.

Journal of Environmental Engineering; May 1998; *Characterization of Solids Transported from and Urban Roadway Surface*; John J. Sansalone, Joseph M. Koran, Joseph A. Smithson, and Steven G. Buchberger; pp. 481-491.

Transportation Research Record 1647, Nov. 1998; *Development and Testing of a Partial Exfiltration Trench for In Situ Treatment of Highway Drainage*; John J. Sansalone, Joseph A. Smithson, and Joseph M. Koran; pp. 34-42.

The Science of the Environment 235; 1999; *Adsorptive Infiltration of Metals in Urban Drainage Media Characteristics*; John J. Sansalone; pp. 179-188.

Wat. Sci. Tech vol. 39, No. 2; 1999; *In-Situ Performance of a Passive Treatment System for Metal Source Control*; John J. Sansalone; pp. 193-200.

Journal of Environmental Engineering; Jun. 1999; *Variably Saturated Flow in Storm-Water Partial Exfiltration Trench*; Yanbo Li, Steven G. Buchberger, and John J. Sansalone; pp. 556-562.

Nov. 18, 1999; Baton Rouge, Louisiana; *Temporal Variations in Heavy Metal Partitioning and Loadings in Urban Highway Pavement Sheet Flow Implications for In-Situ Treatment Design*; John J. Sansalone and Donald W. Glenn, III.

Nov. 10, 2000; Baton Rouge, Louisiana; *A Granulometry-Based Selection Methodology for Separation of Traffic-Generated Particles in Highway Snowmelt Runoff*; Chad Cristina, Jarrod Tramonte, and John J. Sansalone.

Journal of the American Concrete Institute; Oct. 1947; Vol. 19, No. 2; *Cement-Aggregate Reaction in Concrete*; McConnel, et al.

Nicholas J. Garber and Lester A. Hoel, Traffic and Highway Engineering Book, 4 pgs., Brooks/Cole Publishing Company, Pacific Grown, CA USA, pp. 879-881, 1999.

Tom Kazmierowski, Pamela Marks, and Stephen Lee, Ten Year Performance Review of In-Situ Hit Mix Recycling in Ontario, Paper, 1999, 14 pgs., Ontario, Canada.

S.Q.S. Lee and J.M. Corteau, New Asphalt Technologies, Paper, 1998, 7 pgs., Ontario, Canada.

Jean-Martin Croteau and Stephen O.S. Lee, Cold In-Place Recycling Performance and Practices, Paper, 1997, 13 pgs., Ontario, Canada.

Office Action (Restriction Requirement) and Notice of Allowance in copending U.S. Appl. No. 11/843,485.

* cited by examiner

CEMENTITIOUS POROUS PAVEMENT

This is a divisional of serial number 09/916,171, filed on Jul. 26, 2001, which is a divisional application of serial number 09/714,366, filed on Nov. 16, 2000, to which this application claims priority and which is hereby incorporated by reference in its entirety.

BACKGROUND OF INVENTION

The present invention relates to the removal of water borne metal contaminants from water. In particular, the invention relates to a filter media which removes metal contaminants from water passed through the filter media.

An area of increasing concern in the environmental sciences and engineering is the treatment of metals such as Cd, Cu, Zn, Ni, Pb, and Cr, which become water borne and are carried by rain water run-off and the like to environmentally sensitive areas. As used herein, metals being "water borne" means being transported by water in any manner, whether the metal is actually in solution, suspended in water through a particulate bond or a colloidal bond, or simply physically carried by the velocity of flowing water. One of the most common manners in which metals become water borne is through entrainment with storm water run off from road surfaces. The above metals are typically deposited on the road surface though vehicle exhaust, fluid leakage, vehicular wear, pavement degradation and pavement maintenance. Subsequent rainfall entrains the metals and transports the metals to the area in which storm water run-off accumulates. Typically, 60% to 80% of these metals are dissolved in the run-off water, while the remaining percentage is suspended by other mechanisms such as those mentioned above.

It is desirable to intercept the runoff and remove the metals prior to allowing the water to continue to its natural drainage areas. One method of removing the water borne metals is to pass the water through a sorbent filter media. One of the most common media for removing particulate bound metals from water is sand. However, sand has very little capacity for removal of dissolved metals and therefore, is generally not considered effective in removing dissolved metals. Granular activated carbon (GAC) has long used as a media for removing dissolved metals. However, GAC has relatively little absorptive capacity and thus, absorbed metals must frequently be removed or the GAC "recharged." Also, GAC has very little compressive strength. Any application which places a load on the GAC material may cause crushing and a greatly reduce absorptive capacity of the GAC.

A much more recently developed sorbent media is iron oxide coated sand (IOCS). IOCS is formed by coating silica sand with a thin layer of iron oxide and it has been shown to be an effective sorbent media for metals. Iron oxides and hydroxides possess little or no permanent surface charge, but will take on a positive or negative surface charge in the presence of protons or hydroxyl ions. In other words, depending on the pH of the solution in which the iron oxide is place, the iron oxide may take on a net positive or negative charge. A substance which exhibits a net positive or negative charge depending on the pH level may be referred to as an "amphoteric" substance.

Iron oxide typically has a neutral charge in a pH range of approximately 7 to 8. When the pH rises above approximately 8, the iron oxide becomes more negatively charged. Thus, positively charged metal ions borne by water passing over the negatively charged iron oxide will tend to bond to the iron oxide and be sorbed from the water. Conversely, if the pH falls below approximately 7, the iron oxide becomes positively charged and is less likely to bond with metal ions. The pH at which the net surface charge of a particle is zero is denominated the point of zero charge or "pzc".

One major disadvantage of IOCS is that the oxide coating is not sufficiently durable. The comparatively smooth surface of sand particles tends to result in the oxide coating flaking off. Attempts to avoid this flaking have led to time consuming sand preparation efforts such as cleaning the sand of organics and applying a scratch surface to the sand before applying the oxide coating. However, even with these preparation efforts, IOCS still exhibits considerable flaking and thus a lack of oxide coating durability. The smooth surface of sand is also disadvantageous from the standpoint of providing a comparatively low specific surface area (SSA). The specific surface area of a material is generally defined as the surface area per unit mass with the typical unit being $m^2/gm$. As used herein, specific surface area means the total area on the surface of the material in addition to any available porous internal surface area (such as found the GAC discussed above). The greater the surface area of the substrate, the greater the surface area of oxide coating which will be exposed to water borne metals. Thus, it is desirable to provide a substrate with as great of an SSA as possible considering other design restraints. The SSA of sand is typically about 0.05 to about 0.10 $m^2/gm$.

Another problem found in IOCS is the tendency of the oxide coating to crystallize. When the coating crystallizes, the crystals set up a uniform lattice which does not maximize the surface area of the coating. The surface area of the coating is much more optimal if the oxide molecules are randomly distributed in a non-lattice or "amorphous" fashion. For example, the SSA of IOCS may reach 85 $m^2/gm$ if a method of sufficiently inhibiting crystallization could be provided. However, a purely crystallized oxide coating may have a SSA as low as 5 $m^2/gm$. What is needed in the art is a manner to reliably inhibit crystallization in IOCS. Even more desirable would be a substrate other than sand which has a higher SSA than sand and a superior tendency to inhibit crystallization. It would also be desirable to provide substrates which could simultaneously act as a filter and provide other functions, such as providing a roadway pavement or parking pavement. Another desirable characteristic of a substrate (such as porous concrete) would be providing pH elevation to the fluid stream being treated.

SUMMARY OF THE INVENTION

One embodiment of the present invention is an adsorptive-filtration media for the capture of waterborne or airborne constituents. The media comprising a granular substrate and an amphoteric compound bonded to the substrate in the presence of a crystal inhibiting agent.

Another embodiment of the present invention includes an adsorptive-filtration media which comprises a substrate having a specific gravity of less than 1.0 and an amphoteric compound bonded to the substrate.

Another embodiment is a pavement material for the capture of waterborne constituents. The pavement material comprises a porous pavement substrate and an amphoteric compound bonded to the substrate.

Another embodiment includes a process for producing an adsorptive-filtration media for the capture of waterborne or airborne constituents. The process comprises the steps of providing a substrate with a specific surface area of greater than 0.1 $m^2/gm$, introducing the substrate to an amphoteric metal solution, and drying the substrate.

Another embodiment includes an adsorptive-filtration media which comprises a substrate with a specific surface area of greater than 0.1 m$^2$/gm and an amphoteric compound bonded to the substrate.

A further embodiment includes a storm water storage basin capable of supporting vehicular traffic. The basin comprise a layer of porous pavement having a hydraulic conductivity of more than 0.0001 cm/sec. The layer of porous pavement is at least 3 inches in depth, and the layer has a length and a width wherein the ratio between the length and the width is less than 20.

Another embodiment includes a method for producing a porous, cementitious material. The method includes the steps of providing and thoroughly mixing cement and aggregate, mixing water with the cement and aggregate into a slurry while maintaining a water to cement ratio of less than one, initiating curing of said slurry under pressure and in the presence of steam, and continuing the curing at ambient temperature and pressure until the cementitious material is substantially dry.

Another embodiment is a roadway with a gravel shoulder for the removal of waterborne ionic constituents. The roadway comprises a pavement section and a gravel shoulder section adjacent the pavement section. The gravel shoulder has a depth of at least 3 inches and includes gravel coated with an amphoteric compound.

Another embodiment includes a method of constructing a sub-base for the removal of waterborne constituents. The method includes the steps of placing a layer of uncompacted sub-base material; distributing upon the layer a solution containing an amphoteric compound; and compacting the layer to a selected density.

Another embodiment is an adsorptive-filtration media for the capture of waterborne or airborne constituents. The media comprises a flexible, planar, porous substrate; and an amphoteric compound bonded to said substrate.

Another embodiment is a drainage pipe capable of capturing waterborne constituents. The drainage pipe comprise a length of pipe having an interior surface, at least a portion of the surface being designed to be in contact with water. An amphoteric compound is then applied to the portion of the surface designed to be in contact with water.

Another embodiment of the invention includes a process for creating a filtering media for the capture of waterborne or airborne constituents. The process comprises the steps of providing a filter substrate; applying a first coating of an iron oxide compound to the substrate; and applying a second coating of a manganese oxide compound to the substrate.

Another embodiment of the invention includes a roadway with a shoulder forming a filter for constituents. The roadway comprises a roadway pavement section and a cementitious, porous, shoulder adjacent the pavement section and the shoulder having an amphoteric compound applied thereto.

Another embodiment provides an absorptive-filtration media have a porous structure of a fixed matrix and a porosity of approximately 0.05 to 0.6 and an amphoteric Another embodiment provides an adsorptive-filtration media having a granular substrate and an amphoteric compound formed of a manganese oxide formed on the substrate.

Another embodiment includes a method for forming a porous pavement roadway. This method includes the steps of providing and thoroughly mixing cement and aggregate; mixing water with the cement and aggregate forming it into a slurry while maintaining a water to cement ratio of less than one; and placing the slurry into a roadway bed.

DETAILED DESCRIPTION

The filtering media of the present invention generally comprises an adsorptive-filtration media. The media is adsorptive in that it will include a substrate with an amphoteric compound bonded to the substrate to produce a high specific surface area media capable of adsorbing (i.e. the physicochemical capture of) ion contaminants. The media may also have a filtration characteristic which relies on the purely physical capture of contaminants which are larger than the void spaces in the media.

In one general embodiment, the invention includes a granular substrate with an amphoteric compound bonded thereto in the presence of a crystal inhibiting agent. The granular substrate could be sand or any other granular substrate such as crushed limestone, crushed concrete, or other granular substances. In another general embodiment, the present invention includes all substrates having a specific surface area of 0.1 m$^2$/gm or greater and having an amphoteric compound bonded to the substrate. In these latter embodiments with a substrate having an SSA of greater than 0.1 m$^2$/gm, the substrate could include a wide variety of materials such as precast cementitious porous pavement (CPP) discussed herein (SSA of 5-10 m$^2$/gm), wood chips, recycled concrete chips, recycled concrete pavement rubble, natural aggregates, synthetic aggregates, polymeric compounds, granular activated carbon (SSA of 600-1200 m$^2$/gm) etc.

1. Iron Oxide Coated Media.

The amphoteric compound of the present invention is intended to include any compound having amphoteric properties. Preferred embodiments of amphoteric compounds include oxides of iron, manganese, or aluminum.

In regards to iron oxide compounds, there are at least 13 iron oxide minerals, of which there are 8 major iron oxides. These iron oxides differ in composition, the valence state of Fe and in crystalline structure. However, all iron oxides contain Fe and O or OH. Table 1 summarizes the major iron oxides with selected characteristics.

TABLE 1

Selected properties and attributes of major iron oxide minerals.

| Mineral Name | Formula | Structural system | Density (g/cm$^3$) | SSA (m$^2$/g) | Color |
|---|---|---|---|---|---|
| Hematite | α-Fe$_2$O$_3$ | Trigonal | 5.26 | 20–30 | blood red |
| Maghemite | γ-Fe$_2$O$_3$ | Cubic or tetragonal | 4.87 | 80–130 | chocolate |

TABLE 1-continued

Selected properties and attributes of major iron oxide minerals.

| Mineral Name | Formula | Structural system | Density (g/cm$^3$) | SSA (m$^2$/g) | Color |
|---|---|---|---|---|---|
| Magnetite | $Fe_3O_4$ | Cubic | 5.18 | ~4 | black |
| Goethite | α-FeOOH | Orthorhombic | 4.26 | 20–40 | mustard |
| Lepidocrocite | γ-FeOOH | Orthorhombic | 4.09 | 70–80 | orange-brown |
| Ferrihydrite[1] | $5Fe_2O_3 \cdot 9H_2O$[2] | Trigonal | 3.96 | 180–300 | deep brown |
| Feroxyhyte | δ'-FeOOH | Hexagonal | 4.20 | 190–210 | brown |
| Akaganeite | β-FeOOH | Tetragonal | 3.56 | ~30 | dark mustard |

[1] ferrihydrite & feroxyhyte have the only amorphous or poorly-crystalline structures low SSA from $Fe(NO_3)_3 9H_2O$ hydrolysis, high SSA from $Fe^{3+}$ precipitation with KOH
[2] other formulas include: $Fe_5HO_8 \cdot 4H_2O$ and $Fe_6(O_4H_3)_3$ point of zero charge (pzc) for all minerals shown is between pH 7–8
α: hexagonal close packed (more stable than γ)
β: goethite polymorph in presence of high Cl$^-$ levels
γ: cubic close packed
δ': poorly-ordered ferromagnetic form of FeOOH From Table 1 it can be seen that the more amorphous ferrihydrite or feroxyhyte are the forms of iron oxide with the highest SSA. If these forms are coated onto silica sand, their higher SSA, as compared to say the more crystalline hematite, will create a more preferable sorbent media. For this reason, a preferred embodiment of the amphoteric compound focuses on the use of these forms, specifically ferrihydrite. Those skilled in the art will understand that ferrihydrite is not produced in isolation, but is typically formed in a solution having various other iron oxide compounds. The ferrihydrite may transform into other, more crystalline iron oxide compounds (such as hematite or goethite) depending on factors such as temperature, pH, and whether the iron source is ferric or ferrous ions. To inhibit such transformation to the more crystalline compounds, inhibiting agents such as silica ($SiO_2$), silica fume or silica gel, inorganic compounds such as phosphates, polymeric compounds whether naturally occurring (e.g. natural organic matter in soil) or synthetic (e.g. polyethylene), sodium hydroxide, oils, grease, or any other substance which inhibits crystallization, may be introduced in the process for synthesizing ferrihydrite or applying the iron oxide coating. Where sand is the substrate, a highly acidic compound, such as ferric nitrate or ferric chloride (used to form the amphoteric compound as described below) may soluablize silica off the sand substrate, thereby producing an inhibiting agent. Because so many substances may act as inhibiting agents, it is possible that certain impurities in the materials selected (such as grease or oil in a sand substrate) can be engineered to act as a sufficient inhibiting agent without the addition of further inhibiting agents.

Two known methods for producing ferrihydrite follow. The first method involves preheating 2000 mL of DI water to 75° C. in an oven and then withdrawing the water and adding 20 g of unhydrolyzed crystals of $Fe(NO_3)_3.9H_2O$. The solution is stirred rapidly and reheated at 75° C. for 10 to 12 minutes. The formation of iron hydroxy polymers will change the solution from a dull gold color to dark reddish brown. The solution is then dialyzed for three days to produce approximately 5 g of ferrihydrite. This procedure produces a ferrihydrite of lower SSA, in the range of 180 to 200 m$^2$/g.

A second method involves dissolution of 40 g of $Fe(NO_3)_3.9H_2O$ in 500 mL of DI water and addition of approximately 330 mL of 1M KOH until the pH is 7 to 8 while stirring the solution. This procedure produces a ferrihydrite of higher SSA, in the range of 200 to 300 m$^2$/g. The solution is then centrifuged and dialyzed to produce approximately 10 g of ferrihydrite. While both of these procedures work well for a small mass of ferrihydrite (i.e. 10 g) in a laboratory environment, they are not easily adapted to be economically feasible at production or field scale levels that require tons of such a coating. Rather, the above methods would require design and construction of a plant-sized process to produce multiple tons of ferrihydrite.

The present invention includes another, more economical method for producing sufficient quantities of ferrihydrite. In this method, the source of ferric ions is either $Fe(NO_3)_3.9H_2O$, (ferric nitrate (FN)) or $FeCl_3$, (ferric chloride (FC)). Both FN and FC are available as reagent-grade salts or available commercially in larger quantities as bulk solutions. FC has the additional advantage of being more economical and being a by-product of pickling waste. When FN or FC are dissolved in potable water to produce an approximately 1M to approximately 3M solution, the resulting iron oxides in the solution will typically be approximately 50% ferrihydrite and 50% other iron oxides.

2. Applying Iron Oxide to a Substrate.

One substrate to which may be coated with the amphoteric compound may be adhered is sand. Sand typically has a comparatively low SSA of about 0.05 to about 0.10 m$^2$/gm. Moreover, this low SSA is indicative of a relatively smooth surface to which iron oxide coatings will have difficulty adhering. As discussed above, without some agent to inhibit crystallization of the iron oxide coating, the SSA may remain in the range of 1 to 5 m$^2$/gm. To produce a sand substrate filtration media with a markedly improved SSA (about 5-20 m$^2$/gm), sand was subject to a multi-step process as seen in the following two examples.

In the first example, the sand was first cleaned and tumbled in acidic solution (of a pH<2), rinsed with DI water, and then cleaned and tumbled in a very dilute basic solution before a final rinse is made. Second, to promote bonding, an initial scratch coat applied by immersing the sand in an approximately 1M FN solution. The sand was then heat at about 100 degrees C. until this coating was dry and then the sand was disaggregated and rinsed in DI water to remove any loose coating. After this rinsing, the sand was reheated until dry and then cooled. Third, the sand was immersed in another solution of 1.6 M FN. In this solution, 1,000 ppm $SiO_2$ was added (in the range of 1% of the aqueous volume) to help inhibit the transformation of ferrihydrite to hematite or possibly to goethite. Fourth, the sand was again dried with drying times minimized in order not to promote the transformation to hematite due to dehydration. However, drying of the sand at high temperatures could also lead to thermal transformation of ferrihydrite to hematite. It was determined that drying could take place at an acceptably fast rate at 100° C. if an inhibitor such as $SiO_2$ was used to prevent crystalline bonds from forming. Once drying was complete, the sand was allowed to cool and the coated media was disaggregated. As a final step, the media was pH conditioned to a neutral pH by passing DI water at a pH of 8 to 9 (raised with NaOH or a similar base) through the media until the pH of the effluent was between 7.5 and 8, above the point of zero charge for iron oxides. This also removed any loose iron coating. It is noted that the above mentioned scratch coating is necessary because the granular substrate was sand which has a relatively smooth surface. However, other granular substrates such as crushed limestone have a sufficiently rough surface that a scratch coat is not required.

The second example is provided by a large-scale field production. The above method is scaled up by using a larger gasoline-powered concrete mixer and a gas-fired heater. A 3.0 M ferric chloride (FC) solution containing 1000 ppm silica solution was prepared in sufficient volume such that the sand could be completely immersed. Thereafter, heat was applied via the gas-fired heater to evaporate the liquid and attach the iron to the sand surface. Typically greater efforts must be made to insure dryness of the FC treated sand as opposed to the FN treated sand since FC is significantly more hydroscopic than FN. This method proved feasible to produce the required 9 tons of OCS necessary for a related experiment.

For each batch, approximately 90 pounds of filter sand was placed in the concrete mixer with an excess of ferric chloride solution. The amount of ferric chloride solution put into the mixture was enough to just cover the filter sand. The mixture was stirred vigorously and heat applied by the a gas-fired heater. The gas-fired heater was directed into the mouth of the concrete mixer. The slurry was continuously stirred by the concrete mixture until the sand was completely dry. Typical drying time for each batch was 3 hours.

Once dry, the sand was poured from the concrete mixer into a backhoe bucket and placed in a tandem dump truck for cooling. In preparation for pH neutralization, complete drying of the sand was essential to ensure the iron coating would not be removed by the sodium hydroxide in the pH neutralization process. If the sand is not completely dry, the iron coating washes off easily when put into the NaOH solution.

Since the sand was placed in a tandem dump truck for cooling, it decided to neutralize the entire truckload at once to reduced handling of the OCS. The dump truck full of OCS was parked facing down a slope and a solution (of approximately 10 lbs. of NaOH per 55 gallons of potable water) was poured into the truck bed on top of the OCS. The idea was to create a bathtub effect to neutralize the sand. The truck bed did leak but the level of the solution was kept above the depth of the sand with continual addition of NaOH solution. Leakage of the truck bed proved beneficial due to the continual addition of new solution to replace loss. The new solution was more capable of neutralizing the OCS while the used solution was removed from the system. The pH was checked with a pH probe at several depths in the truck bed to ensure complete neutralization. Approximately 10 tons of OCS was produced, the largest known quantity of such material. In the above process, the inhibiting agents were formed by the impurities found in the mixer, the gas-fired heater, NaOH and the construction process in the field to such a degree that it was not necessary to add additional silica as an inhibiting agent.

3. Substrates with a Specific Gravity Less than 1.0.

Figure 1:
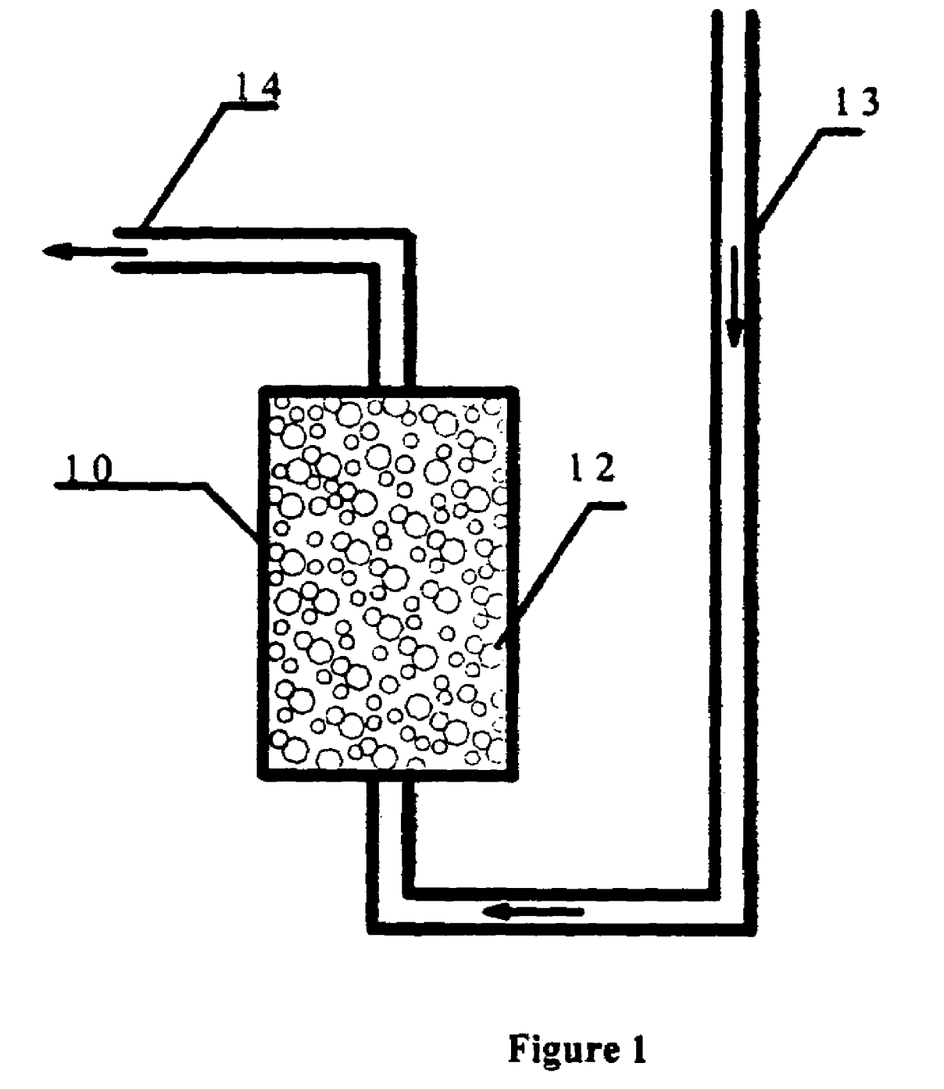
FIG. 1 is a diagram of an upflow filter.

There are a large number of likely substrates having an specific gravity of less than 1.0. One family of such substrates is wood, with pine having by way of example a specific gravity of about 0.35. Another family of such substrates are polymeric compounds. Polymeric compounds may include light weight materials such as foam packing pellets, which would form a granular media having a specific gravity of approximately 0.2. Polymeric compounds could also include heavier polymers having a specific gravity of up to 0.97. Polymeric compounds could also include polymer-type materials which have similar weight, flexibility, and long molecular chains. Of the polymer family, it has been found that polyethylene (PE) or polypropylene (PP) have many characteristics making them suitable substrates for the present invention. PE and PP have a specific gravity of about 0.9. It is believed PE, PP, and other similar polymeric compounds are particularly useful when in the form of polymeric floating media filter beads. Normally, polymer beads will have a specific gravity ranging between approximately 0.50 and 0.95. One simple example of a "filter" or "clarifier" using floating polyethylene beads can be seen in FIG. 1. In the embodiment of FIG. 1, the filter is a cylindrical geometry upflow filter, but the filter could utilize many geometries and flow directions depending on constraints such as media type, coating, specific gravity and design intentions. Filters using floating polyethylene beads are usually upflow filters such as seen in FIG. 1, but can be downflow filters and have a variety of geometric shapes. In FIG. 1, the upflow filter 10 is filled with floating polymeric beads 12. An influent flow 13 flows into filter 10, through beads 12 (where it has pollution constituents adsorbed and filtered), and exits as effluent 14. While not explicitly shown in FIG. 1, the upflow filter 10 could utilize any number of methods well known in the art for backwashing the beads. Upflow filters have the advantages of being easily backwashed to prevent clogging and are less likely to hydraulically "short-circuited" (i.e. water cutting an uninterrupted fluid path through the beads and not having to flow around the individual beads). It has been found that allowing a layer of sediment to form at the base of the filter media may actually enhance filtration as long as the layer does not become so thick that the layer significantly inhibits design flows. The filter media would be backwashed at the point design flows were significantly inhibited. It is also very practical to direct water through an upflow or downflow filter when the water is being drained from a elevated grade (such as a highway overpass or an elevated interstate).

One preferred method of applying the amphoteric compound to the polyethylene is similar to that used to apply iron oxide to sand and is as follows. A 1 to 3 molar solution of FN or FC (preferably about 1.6M) is prepared by dissolving the FC or FN in water. The polyethylene beads are placed in the solution and continuously stirred. The polyethylene should remain in the solution a sufficient time for the entire surface area of the polyethylene to become coated with iron oxide. An hour should be sufficient period of time under most circumstances. The water is then evaporated from the solution containing the polyethylene at a temperature of approximately 90°-95° C. The drying may take place at lower temperatures, but will unnecessarily slow the drying process. Drying at higher temperatures is possible, but may be undesirable from the standpoint of the polyethylene becoming excessively plastic at temperatures above 95° C. and crystallization of the iron oxide becoming more prevalent at higher temperatures.

One favorable characteristic of employing polyethylene as a substrate is that polyethylene has an inherent tendency to inhibit the crystallization of the iron oxide. This is believed to occur by way of polyethylene molecules detaching from the substrate surface and becoming lodged in the iron oxide molecules depositing on the substrate surface. As alluded to above, this disruption of a uniform iron oxide lattice tends to create a favorable, amorphous (thus high specific surface area) coating of iron oxide. In addition to taking advantage of the natural crystallization inhibiting character of polyethylene, when using an iron oxide as the amphoteric compound, it also desirable to further add an inhibitor such as the 1000 ppm $SiO_2$ solution discussed above. The amount of $SiO_2$ solution may vary, but an amount equal to 1% of the aqueous volume is normally considered sufficient. If manganese oxide is the amphoteric compound, it usually is not necessary to add an inhibiting agent to achieve an acceptable SSA. Significantly, it has been found that polyethylene beads having a specific gravity of about 0.9 maintain a specific gravity of less than 1 (and therefore float) even after being coated. The coating generally raises the bead's specific gravity to about 0.95.

While the above procedure described applying an amphoteric compound to polyethylene beads, it will be understood that the procedure could be carried out numerous other polymeric materials. For example, an amphoteric compound could be applied to simple packing material, cheap polymeric woven and non-woven material, geosynthetics and expanded foams as well. The foams have to be dried at a lower temperature so they do not melt, so for the case of expanded foams or heat sensitive polymerics, manganese coatings are preferable to iron coatings (which require higher temperatures to dry).

4. Manganese Oxide Coated Media.

As mentioned above, another family of amphoteric compounds are oxides formed from manganese. There are a whole series of manganese oxide minerals that can be produced that have useful characteristics as media coatings for the treatment of storm water and other waste streams containing heavy metals. However, two manganese oxides groups comprise preferred embodiments for use with the present invention because their combination of negative surface charge (measured as units of charge per surface area) at nearly all environmental pH values and because of their high specific surface area. This results in a coated media surface with a high surface density of negatively charged sites for adsorption of heavy metals. These two manganese oxides are birnessite (whose structure is not completely understood, but is believed to be in part a layered ($MnO_6$) structure and cryptomelane, ($\alpha$-$MnO_2$) which is a tunnel structure. Both are different manganese oxide minerals having different structures. Although not as critical as with iron oxides, some inhibition of crystallization may be helpful to produce poorly crystalline structures and higher surface area.

Figure 2:
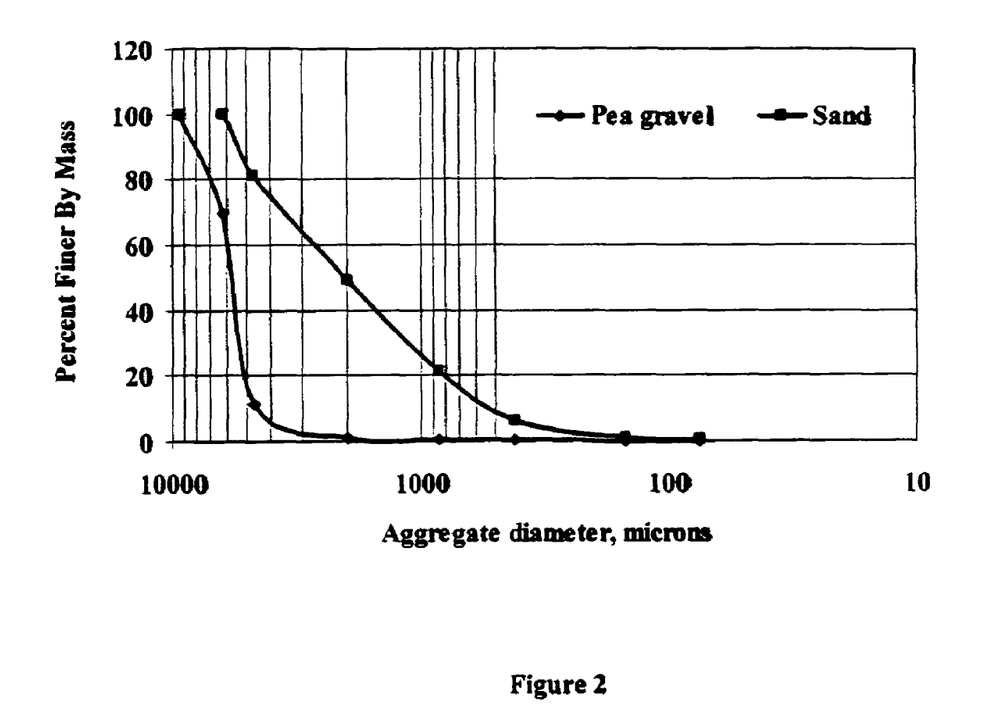
FIG. 2 is a chart of surface charge versus pH for certain amphoteric compounds.

The point of zero charge (pzc) of manganese oxides and the surface charge density are the keys to an important advantage of manganese oxide coatings over iron oxide coatings in the adsorption of heavy metals. Iron oxide coatings only have a negative charge on their surface when the pH of the solution surrounding the media is greater than the pzc of the coating. For pure iron oxides crystalline minerals, this ranges from 7 to 8 depending on the mineral form of iron oxide (i.e. goethite, hematite, etc.) and is a comparatively narrow range. For silica-inhibited ferrihydrite this pzc can be between pH values of 5.5 to 7.5. For manganese oxides the pzc values are much lower. The pzc occurs at a pH of less than 5. Reported values are in the range of 2 to 3. FIG. 2 illustrates the pzc for the manganese oxides Birnessite and Cryptomelane and the iron oxide Goethite. Thus, for manganese oxide coated media there is a strong negative charge at typical environmental pH levels of 6 to 8. This also means that pH conditioning such as rinsing with DI water is usually not necessary for manganese oxide coated substrates.

Those skilled in the art will recognize there are numerous methods of producing manganese oxides for use in the present invention. The following two methods disclose one preferred method of the present invention for producing both birnessite and crypotmelane.

Method A: Bimessite Coating Method (BCM).

The disclosed binessite coating method uses a wet oxidation procedure to precipitate the colloid of birnessite on the media surface. In other words, a solution containing manganese was oxidized to create an $MnO_x$ form. Two moles of concentrated hydrochloric acid (37.5%) were added dropwise and continuously to a boiling solution of 0.5-M potassium permanganate in 1 liter of water, to which 0.5 liters of media was added, immersed and vigorously stirred. The media actually used included plastic beads, sand, GAC, concrete blocks and concrete rubble. However, any other suitable media (wood, etc.) could also be used. After boiling for further 10 minutes, the media was washed with water and dried at room temperature overnight. Under lab conditions, a reasonably pure form of birnessite can be produced (>80 pure). This produced a coating having a surface area of 70-90 $m^2$/g (i.e. surface area of coat as applied to the substrate) with a pzc at a pH near 3. At environmental pH values the surface charge density is very negative (−10 to −20 micromoles/$m^2$). This coating has an approximate mean of about 1200 micromoles of negative charge per gram of coating.

Method B: Cryptomelane Coating Method (CCM).

The Cryptomelane coating method uses a wet oxidation procedure to precipitate the colloid of cryptomelane on the media surface. A solution of 0.35 moles $KMnO4$ in 800 ml of water is heated to 60° C. and dropwise continuously added into a solution 0.5 moles of $MnSO_4$ in one liter of 2M acetic acid. This solution was heated with 500 ml filtration media (such as acid washed polyethylene beads or any of the media types named above) to 80° C. while vigorously stirring. After stirring for 15 minutes, the media was removed, filtered, washed with water and allowed to dry at room temperature overnight. Under lab conditions a reasonably pure form of cryptomelane can be produced (>80 pure). This will produce a coating having a surface area of 200 to 270 $m^2$/g (i.e. the surface area of the coating itself rather than applied to the substrate as above) with a pzc at a pH near 3 to 4. At environmental pH values the surface charge density is very negative (−2 to −5 micromoles/$m^2$). This coating has an approximate mean of about 823 micromoles of negative charge per gram of coating.

It will be understood that the most significant factor is the combination of specific surface area and surface charge. The difference between 1200 and 823 can be important when these coatings are applied consistently as with a chemical process operation. It should be noted that at the upper end of environmental pH values, ferrihydrite (iron oxide) has a surface area of between 200 and 300 $m^2$/g and a surface charge density of −0.1 to □1.0 micromoles/$m^2$. Silicate (a form of silica) contamination (addition of silica solution or natural silica in clay minerals), tends to prevent ferrihydrite from transforming to other iron oxides and thus tends to keep the pzc at a pH of around 5.5 to 7.5, as is typical for ferrihydrite. This coating has an approximate mean of about 113 micromoles of negative charge per gram of coating. However, the cost of an iron oxide coating is approximately 1/10 to 1/5 of a manganese coating. This cost does not include the cost of pH conditioning of the influent for iron oxides which can be significant for engineered systems.

Those skilled in the art will recognize that there is a variety of synthetic manganese oxide minerals as there is with iron oxide minerals. However, manganese oxides have not been as well studied as iron oxides. Technically, the term "birnessite" is used to refer to a group of manganese oxides for which the exact structures are still to a certain extent unknown. What is known is that these birnessite minerals are layered structures. Examples of birnessite minerals having a valence>+4 are vernadite, ranciete, buserite, and lithiophorite. Examples of birnessite minerals with a valence <+4 are magnetite and hausmannite. The other manganese oxides are tunnel structures. One of the more common is cryptomelane which forms a group of manganese oxides along with hollandite and coronadite (all having $\alpha$-$MnO_2$ structures with a large foreign cation (K, Ba or Pb respectively) as part of the structure). Other minerals include ramsdellite ($\beta$-$MnO_2$), Nsutite ($\rho$-$MnO_2$), romanechite ($MnO_6$) and todorokite. All of these minerals have negative surface charges and have SSA's that fall in the range of 50 to 280 $m^2/g$. Birnessite and cryptomelane are easy to produce and provide a good combination of negative surface charge and SSA for adsorption of cationic species (mainly heavy metals) when the pH is above the pzc (see FIG. 2). Naturally, it will be understood that lowering the pH below the pzc will allow the removal of anionic species such as nitrite ($NO_2^-$), nitrate ($NO_3^-$), or phosphates ($PO_4^-$).

It will be recognized the choice between iron oxide and manganese oxide present a typical design choice which will be governed by the particular engineering problem being addressed. Additionally, different concentrations of the metal oxides have been used in the solutions in which the substrate is immersed. The concentrations may range from 0.1 M to 3.0 M (or higher) solutions of the metal oxide. Nor is the invention limited to immersing the substrate in a metal oxide solution. Rather, the metal oxide solution could be an aerosol which is spayed onto the substrate. This technique works well in a reactor that fluidizes the media using a gas such as air. The metal oxide coating is injected as a fine spray onto the fluidized media. Once the media is coated, the temperature in the reactor would be raised to evaporate of the water and leave the oxide coating on the media. The media will continue to be fluidized throughout this process. The reactor can be as simple as an upflow column or a conical upflow reactor. A significant advantage of this technique is the savings created by the efficient use of the coating material.

Although not as generally preferred as iron oxides or manganese oxides, aluminum oxides may also be a viable oxide coating, especially on materials such as CPP. The chemistry of aluminum oxide indicates that it should be a viable material and the cost of this material is relatively low. Therefore, aluminum oxides (such as forms of $Al_2O_3$) used as amphoteric compounds are intended to come within the scope of the present invention.

The advantage of various alternative embodiments of the present invention will become apparent as those skilled in the art begin to practice the invention. For example, using cementitious porous pavement (CPP, discussed below) as the filter media or coating substrate allows a unique manner of avoiding the cost of pH conditioning of the influent. As is well known, cement is largely composed of alkalinity-producing substances and therefore is capable of pH elevation. One method is to coat only the bottom half of a CPP pavement block with iron oxide or manganese oxide. Then, as pavement runoff percolates down through the upper exposed cementitious material near the pavement surface, the pH of the percolating runoff will be elevated above the pzc of the iron oxide coating on the lower half of the CPP block and thus, the lower half of the CPP block form an efficient passive fixed adsorption matrix.

5. Cementitious Porous Pavement (CPP)

Those skilled in the art will recognize many design issues which apply to the choice of substrates or filter media. As discussed above, the media may be many materials such as sand, polyethylene beads, or a fixed porous matrix such as cementitious porous pavement (CPP). Typically, the prior art is only concerned with making cement structures as impervious to water as possible. However, one aspect of the present invention is creating a cement substrate which is quite porous. A wide range of size and gradation of material may be used as media and CPP blocks may be used in their block form or broken up to serve as a rubble media. Issues such as contact time, contact surface area, filtration ability, and hydraulic conductivity required will determine the choice of media or rubble size. Any of the above described amphoteric coating preparation techniques may be applied to CPP material either as the material is being produced (described below) or after the material has been produced without a coating (in large or small blocks or as sections). If the CPP material is not produced with the amphoteric compound as an admixture, the block of material will be immersed in the amphoteric coating solution of choice and the solution is circulated through and around the CPP block. Because of contact time issues, one preferred method requires the intact CPP blocks to remain in the circulating manganese oxide solution for 60 minutes before removing and drying. Drying may take place at room temperature for several days under still air conditions or for 24 hours when air is being blown by both sides of the block. Alternatively, the porous block could be sprayed with a manganese oxide coating, allowed to dry, and then be used.

The CPP must be sufficiently porous to allow migration of water therethrough, but retain sufficient strength to withstand vehicle wheel loads typically encountered by road-side shoulders. One measure of the ability of CPP to allow the migration of water is saturated hydraulic conductivity (Kst) measured in cm/sec. For purposes of the present invention, the hydraulic conductivity of the CPP could range between 1.0 and 0.001 cm/sec. One preferred embodiment has a hydraulic conductivity of about 0.01. While there may be situations where a very high hydraulic conductivity is desirable, this must be balance against concerns with sufficient structural strength and sufficient surface contact between the pavement and the fluid flowing through it to insure mass transfer and/or filtration by the pavement. The factors affecting the porosity of the CPP are the water to cement ratio, whether and how much pressure is applied during curing, and to a lesser degree, the amount of fine aggregate in the mix.

A) Production of CPP as a Precast Uncoated Block.

While there are many mixtures which would form the CPP of the present invention, three preferred mixtures are disclosed below in Table 1. The water cement ratio for each mix design is varied, ranging from 0.14 to 0.32. However, these water cement ratios were used in conjunction with steam curing as described below. Those skilled in the art will recognize that if steam curing is not used, the chosen water cement ratio would probably be higher. Nevertheless, to maintain a hydraulic conductivity of between 1.0 and 0.001 cm/sec., it is suggested that the water cement ratio be maintained below 1. When CPP is used as a cast-in-place material (i.e. not steam cured) a water cement ratio of 0.3 to 0.4 would be a recommended range.

Figure 3:
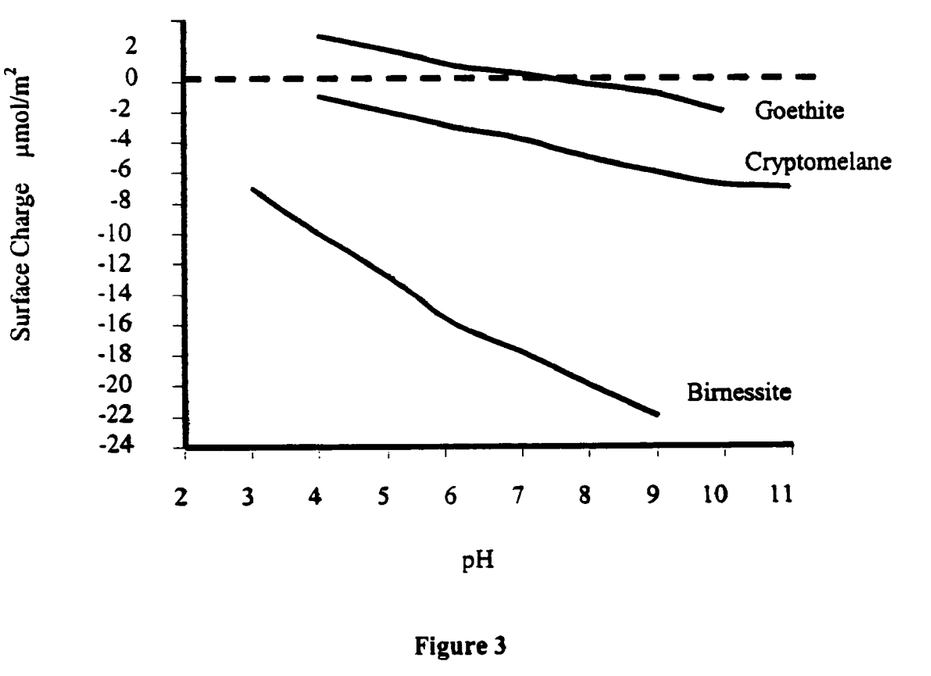
FIG. 3 is a chart of aggregate distribution.

Typically, the ratio of fine to course aggregates will be approximately 1 to 1. While this ratio could vary, an excessive amount of fines may tend to reduce porosity by filling passages in the cement structure. As an illustrative sample, the grain size distribution of the pea gravel and sand used in Batch 2 is presented in FIG. 3.

TABLE 2

Mix Designs for Porous Pavement Block

| Component | Batch 1 | Batch 2 | Batch 3 |
|---|---|---|---|
| Cement (Type II) | 109 kg (240 lbs) | 109 kg (240 lbs) | 109 kg (240 lbs) |
| Water | 15-20 kg | 20-25 kg | 30-35 kg |
| Coarse Sand | 472 kg (1040 lbs) | 381 kg (840 lbs) | 431 kg (950 lbs) |
| # 9 Gravel | 336 kg (740 lbs) | — | — |
| Pea | — | 381 kg (840 lbs) | 331 kg (730 lbs) |

— Indicates material not used in batch

The pavement resulting from the disclosed mixes was formed in various sizes of pre-cast blocks, for example 24 inches×16 inches×4 inches thick. Naturally, this should by no means be considered an optimal size, but rather dimensioning of the blocks will depend on the application. The blocks were subject to a conventional pressurized, steam curing process. The process incorporates a press using hydraulic compression to press the concrete mix into the block form. The hydraulic press was capable of exerting up to 35 kN (4 tons) of force on the wet cementitious mix in the form and the full 4 tons was applied in this experiment. Typically this pressure was applied for 1 to 4 minutes. Then the precast CPP blocks were steam cured (in a kiln with over 90% humidity) for four days to a week to promote adequate cement hydration and then the blocks were allowed to air dry for two days before transport. Longer steam curing up to 28 days will produce a higher strength material. Of course, there is a substantial amount of flexibility in the application of these various components in making CPP. For example, although the experiment above used 4 tons of force (or about 3000-lb/ft$^2$) applied for approximately 1-minute, both the force and duration of the loading can vary based on the application. Those skilled in the art will recognize many applications that may require less force or applications requiring more or less duration of the loading.

From each porous pavement mix design, a block was sampled at random to determine the strength and infiltration capacity. From each block five cores are drilled using a 8 cm (3 in.) outside diameter diamond tipped coring bit. This yielded cores approximately 7 cm (2.75 in.) in diameter. The infiltration capacity of the porous pavement blocks was evaluated by the falling head permeability test for soils. Each core was wrapped with an impermeable membrane to determine hydraulic conductivity of the block. Flow was introduced from the bottom of the sample to ensure complete saturation. Two trials were taken for each core resulting in ten hydraulic conductivity values for each porous pavement mix design. As shown in Table 3, Batch 2 has the greatest hydraulic conductivity. Blocks tested later as full blocks had a full block $K_{sat}$ of approximately 0.01 cm/s.

Since the CPP on the roadway shoulder may be subject to occasional traffic loads (or many wheel loads in the case of parking areas), block strength is an essential consideration in the design. The unconfined compression strength of the blocks was evaluated. Two of the five cores from each mix design were tested to determine the unconfined compression strength. Since the length to diameter ratio of the cores was less than 1.8, the strength was reduced by applying the appropriate correction factor as designated in ASTM C-39. The resulting compression strengths of the three batches are seen in table 3.

TABLE 3

Properties of the CPP Blocks

| Mix Design | Unit Weight | Average Hydraulic Conductivity (cm/sec) | Average Unconfined Compressive Strength |
|---|---|---|---|
| Batch 1 | 14.8 kN/m$^3$ (93.9 pcf) | 0.0091 | 37,500 kPa (5440 psi) |
| Batch 2 | 14.1 kN/m$^3$ (89.6 pcf) | 0.0098 | 27,700 kPa (4020 psi) |
| Batch 3 | 14.6 kN/m$^3$ (93.0 pcf) | 0.0090 | 33,600 (4880 psi) |

It is noted that these are only a few examples of measured properties of CPP blocks. In other blocks, it is envisioned using CPP where the hydraulic conductivity values are designed either higher or lower than the above values by adjusting the water to cement ratio or adjusting the fine to course aggregate ratio.

B) Making Concrete Media, Cement Media or CPP with an Amphoteric Admixture.

Previously described was a process of creating CPP blocks and then coating the blocks with an amphoteric compound by soaking the blocks in a solution containing the amphoteric compound. However, the amphoteric compound could also be incorporated in the CPP as part of the process of mixing the cement/aggregate slurry. An example of this method follows.

In a shallow container of large surface area compared to depth (in the lab environment, shallow Pyrex trays in the range of 12×16 inches were used), there is placed a solution of 0.3 to 1.0 molar solution of manganese. The solution can be made by either method described above. To this solution, add a total of 1-kg of cement, and aggregate at the water/cement ratio and cement/aggregate ratio of choice to produce concrete of the strength and porosity desired. Those skilled in the art will understand that whatever volume of amphoteric solution is added should count toward the total water cement ratio. For example, using 1 kg of cement and a water cement ratio of 0.5, the adding of 0.25 kg of amphoteric solution will require an additional 0.25 kg of water to be added. The mixture is then dried (i.e. the cement is hydrated and the concrete mixture hardens) approximately 12 hours. It should be noted that at least part of the water in water-cement slurry is actually the solution of manganese oxide. In effect, the entire cementitious material is coated inside and out side with a manganese coating. The same method could be carried out for an iron oxide coating but with the one difference; the CPP or cementitious media must be dried at an elevated temperature of 90 to 100 C for at least 24 hours. As with all media discussed above, if an iron oxide coating is not fully dry before rinsing, some of the coating will be washed off. This typically is not a concern with manganese oxide coatings since manganese oxides usually bond far better to substrates such as CPP (and polymer beads) than iron oxides.

With cementitious material as a porous matrix (i.e. as a substrate), final pH conditioning of the iron oxide coating is not required because the alkaline nature of the cement raises the pH to acceptable levels. In fact, the acidic nature of the iron oxide solution (and to a lesser extent the manganese oxide solution) actually creates more internal porosity of the CPP by consuming a portion of the cement matrix through a neutralization reaction. However, this increased internal porosity also results in a reduction in the cement matrix's strength. This is problem which is much less prevalent when manganese oxide is the amphoteric compound.

Figure 4:
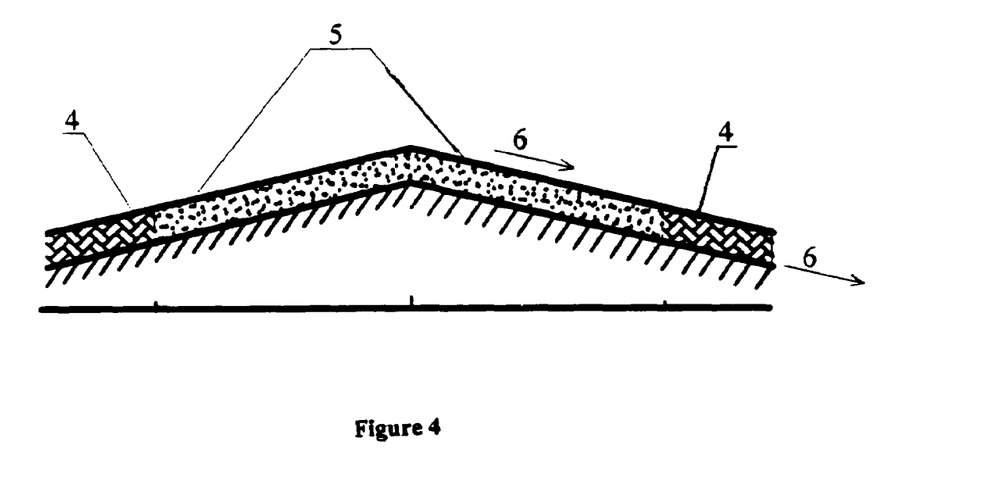
FIG. 4 is a cross-section of a roadway.
Figure 5:
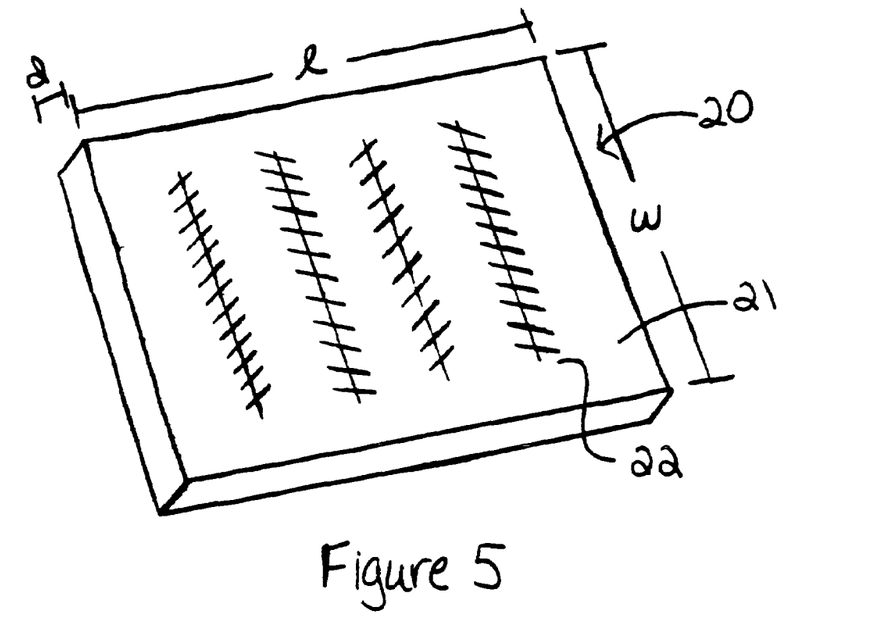
FIG. 5 is a conceptual illustration of a storm water storage basin.

One useful application of a CPP coated with an amphoteric compound is as a roadway runoff filtering shoulder. FIG. 4 illustrates a cross-section of a typical roadway. The roadway will have driving lanes 5 with shoulders 4. In FIG. 4, the shoulders are formed of a CPP having an amphoteric compound coating as described above. Typically, the CPP shoulder will have a thickness ranging from 4 to 16 inches. Rainwater run-off depicted by arrows 6 will flow off of the driving lanes 5 and onto the CPP shoulders 4. The runoff will percolate into the CPP material and metal ions will be sorbed by the amphoteric compound on the CPP material. The runoff (with metal ions removed) will then flow out of the side and bottom of the CPP shoulders 4.

Another application of concrete produce with an amphoteric solution is use as a crushed aggregate filter media. In other words, the object is not to have water flow through the individual pieces of concrete, but to have it flow around broken up concrete rubble. To create a concrete media or cement media that is fully impregnated with manganese, the water-cement ratio would be higher to ensure sufficient cohesive and adhesive bonding within each piece of media. In this situation, the water cement ratios are close to that of standard concrete mixes and a preferred range would be 0.40 to 0.90. This water cement ratio includes the aqueous solution gained from the admixture. This will be referred to as the "aqueous solution cement ratio" to imply that both water and the admixture solution are considered in computing the ratio. The concrete would be mixed as above and once it hardens (from example, after 12 hours), it is broken up as rubble into media sizes of choice. Typically these sizes can range from 0.2 to 10 mm. The rubble could then be coated with an amphoteric compound such as described above in regards to polyethylene beads.

Another preferred method of coating the CPP (or other substrates) includes recoating the media. One example of recoating the media was accomplished by placing the media in a column in which it will be fluidized with a recirculating flow of manganese solution. Thus, 1-kg of media was placed in a vertical column (the column was approximately 2 liters in volume) with a 6-liter recirculating solution of $10^{-3}$ M $NaHCO_3$ and 0.035-moles/liter $Mn^{2+}$ (stoichiometric amount) and re-circulating this solution with a pump capable of handling aggressive solutions and with a sufficient capacity to fluidize the bed. The $Mn^{2+}$ is oxidized by adding 250-mL of a 0.185 M solution of NaOCl at a flow rate of 5 mL/minute for 1 hour to ensure complete oxidation of the manganese. The manganese oxide in this solution is then re-circulated for an additional 2 hours with 250-mL of 0.185 M NaOCl added in one step at the beginning of the 2 hours. After 2 hours, the solution was drained and then replaced with water (in the lab, it was de-ionized (DI) water) and re-circulated for 15 minutes and then the column was drained of the water solution. The media was then rinsed with water (DI in lab) to a pH of 7 and then allowed to dry overnight before use. The rising of a manganese oxide coated media with DI water was mainly to remove impurities in order to obtain laboratory quality samples. In practical field applications, the final rinsing of manganese oxide coated media could be dispensed with.

Naturally, re-coating of the media is not limited to manganese oxide upon manganese oxide. Another re-coating method would include a first coating with iron oxide followed by a second coating of manganese oxide. If the iron oxide coated material produces a sufficiently high SSA substrate for the intended application, this latter method may be more desirable since iron oxide is normally less costly than manganese oxide. Thus, a comparatively inexpensive substrate such as sand with a low SSA may be coated with iron oxide to produce a comparatively high SSA substrate (i.e. a substrate with a SSA much greater than 0.1 $m^2/g$). In other words, the iron oxide coated sand becomes the substrate for the final filter media which is coated with manganese oxide. Additionally, the increased SSA achieved by re-coating may be applied to any of the above disclosed substrates (CCP, wood, polymers, etc.) or with other oxides such as aluminum or other surface active materials of high surface area and amphoteric nature.

Additionally, substates could be formed from any porous structure having a fixed matrix. An example of such a porous fixed matrix would be solidified lava (or lava rock). A fixed matrix having a porosity of between 0.05 and 0.6 would be suitable for use in the present invention.

6. Other Embodiments of the Present Invention.

The present invention may be put to enumerable uses. For example, while the above disclosure discusses a cementitious porous pavement material, the porous pavement material could also be bituminous or asphaltic. Porous asphalt can be made by reducing the asphaltic binder and, in effect, producing a lower binder—aggregate ratio. Typically, the amphoteric compounds described above may also be added to the bituminous porous pavements during the mixing stage, creating the same type of waterborne metals filter. However, with all porous materials, an amphoteric material can always be added as a surface coating and much of the porous surface can be coated by application of a spray on the porous surface.

Large areas of porous pavements may also be used as storm water storage basins. Parking lots and similar large paved areas are often the source of significant volumes of storm water runoff. The porous pavement of the present invention provides a means of substantially reducing the volume of runoff from such large pavement areas. These areas may be defined as a ratio of their length to width. For purposes of the present invention, a storage basin may be any pavement area having a length to width ratio (i.e. length/width) of less than 20. A typical parking area formed of porous pavement would have a porous pavement with a hydraulic conductivity of between 0.0001 cm/sec and 1.0 cm/sec and more preferably of around at least 0.001 cm/sec. Because it is not necessary to transfer the water so quickly in parking areas, it preferred to have higher strength and lower porosity. Porous pavement having a hydraulic conductivity of 0.001 cm/sec. and 1.0 cm/sec will normally have a strength of between approximately 3000 psi and 5000 psi. The void volume will be approximately 20% to 30% of the total volume of the concrete. Such a layer of porous pavement should be at least six to eight inches in depth and preferably, at least twelve to fifteen inches in depth. This depth provides both the necessary strength to support vehicular traffic and also provides a sufficient volume of pore space to store the water from an average rain storm. With a 20% to 30% pore volume, a 6 inch slab of porous pavement could retain as much as 1 to 1.8 inches of rainfall upon that slab. Rather than placing further strain on storm sewers, the rain collected in the porous pavement will be left to evaporate during dryer days. This method of storing runoff from parking lots has the further benefit of tending to immobilize parking lot pollutants entrained by the rain water. Rather than leaving the premises of the parking lot, such pollutants will be retained in the porous pavement. As the water evaporates from the porous pavement over time, the pollutants will tend to be retained in the pavement. Many pollutants may be volatize into the air during evaporation, a process which is preferable to the pollutants becoming dissolved in water. Additionally, the porous pavement may be treated with an amphoteric compound in order to improve the capture of waterborne ionic constituents which are held in the porous pavement while the retained water evaporates. It can readily be seen how a parking lot constructed of porous pavement will form a storm water storage basin capable of supporting vehicular traffic.

Another embodiment of the present invention includes a roadway gravel shoulder capable of capturing waterborne ionic constituents entrained in roadway rain runoff. Roadways often have gravel shoulders at least four inches in depth, more typically six to eight inches in depth and for larger roadways, often over eight inches in depth. Commonly, the gravel for roadways is graded to have an average diameter of between three-fourths of an inch to one inch. To carry out this aspect of the invention, the gravel may be coated with an amphoteric compound such as one of the iron oxides or manganese oxides disclosed above. Preferably, this would be done prior to placing the gravel as a roadway shoulder. Any of the coating processes discuss above would be suitable, but the previously described field method for producing large quantities of iron oxide coated sand would be one preferred method. The gravel could also be subject to the multiple layer coating also described above. Once the coating process for the gravel was complete, the gravel would be placed along the roadside in the normal manner for creating a shoulder. This manner of capturing waterborne ionic constituents is advantageous because it can passively filter and treat pavement sheet flow directly at the edge of the pavement before the flow becomes concentrated.

A still further embodiment of the present invention encompasses coating a flexible, planar, porous substrate with an amphoteric compound. One example of a flexible planar, porous substrate would be geosynthetic fabrics which are well known in the art. Geosynthetic fabrics are generally polymeric materials which are designed to be placed in or against soil. Often geosynthetic fabrics are used to retain soil in place while allowing water to pass through the fabric. Geosynthetic fabrics may be woven or nonwoven. Woven geosynthetic fabrics are fabrics with filaments in warp (machine direction) and weft (cross-machine) direction. Nonwoven fabrics have essentially a random fabric or textile structure. For example, common felt is a nonwoven textile. Nonwovens are further characterized according to how fibers are interlocked or bonded, which is achieved by mechanical, chemical, thermal or solvent means. Some of the polymeric materials used to construct geosynthetic fabrics include: polyethylenes—PE, HDPE, LDPE, XLPE, FLPE, CPE, CSPE; polypropylene—PP, polysulfone—PSF; polyurethane—PUR; polycarbonate—PC; polyvinyl chloride—PVC, polystyrene—PS; thermoplastic elastomer—TPE; nylon—PA; polyester—PET; nytrile; butyl; acetal—ACL; and polyamide—PA. Most typically, geosynthetics are formed from PE, PP, PVC, PET, PA or PS. The application of an amphoteric coating to the geosynthetics could be carried out by a process similar to that described above for coating polyethylene beads. However, rather than stirring the beads, the sheets of fabric are dipped in solution, pulled them out of the oxide solution, and then dried them. The sheet could be left in the solution while dried, but this method wastes a substantial amount of oxide solution. With fabric or sheet material, the preferred techniques will be to spray on the solution and dry or a dip in the solution and dry.

Geosynthetic materials coated with amphoteric oxides can serve as more effective filters (higher surface area and surface roughness) which can adsorb cations (e.g. heavy metals) or anions (e.g. phosphates) depending on the pH of the aqueous stream, seepage, ground water, or the like. The filters of the present invention can be in-situ or ex-situ. An example of an in-situ filter would be where one has shallow contaminated groundwater or one is directing a flow of storm water into a trench. One can place a sheet of oxide coated geosynthetic in a trench, backfill around it and let the flow passively move through the trench and therefore move through the more permeable geosynthetic to provide in-situ treatment. Ex-situ filters would be all of those cases where one does treatment in some form of a device or reactor, like the upflow column seen in FIG. 1.

Another example of a flexible planar, porous substrate would be membrane materials. Membrane materials typically have much smaller pore sizes than other filters, commercially available on the order of 0.1 to 50 microns and can be up to 3000 or more microns. Often membrane materials are formed from a type of cellulose such as cellulose acetate, cellulose esters, cellulose nitrate, or nitrocellulose. The amphoteric coating may be applied as described above for oxide coated geosynthetics. The membrane substrates may be considered "membrane filters" in the sense that they capture constituents only on their surface. This is distinguished from the other substrates described herein which act as "depth filters." Depth filters capture constituents through some depth (even if relatively shallow) in the substrate.

The flexible planar, porous substrate could also include any number of convention filter materials or devices which have a larger area dimension than depth dimension. For example, conventional air conditioning or furnace cartridge filters could be formed by having an amphoteric compound applied to the filter media within the cartridge. The filter media will typically be a fiberous polymeric or glass material woven or meshed together at different densities depending on the intended use of the filter.

A further embodiment of the present invention includes a drainage pipe capable of capturing waterborne ionic constituents. Most storm water runoff is carried through conventional concrete pipes for at least part of the journey to its final collection point. Thus there is the opportunity to bring the runoff into contact with a pipe surface coated with an amphoteric compound and remove ionic constituents from the water. Typically, drainage lines are sized to accommodate a standard runoff rate which is less than the total capacity of the drainage pipes. In other words, drainage lines are not designed to have the average runoff completely fill the volume of the drainage pipe. This means that less than the entire inner circumference of the pipe is designed to come into contact with the runoff water. Therefore, it may not be necessary to coat the entire interior of the pipe with the amphoteric compound, but rather only coat the portion of the inner pipe surface designed to be in contact with the water. It will be obvious that the decision concerning how much of the inner surface of the pipe should be coated is a engineering design choice which will vary according to the design parameters. One manner of applying the amphoteric compound will simply be to immerse the section of pipe to be coated in an amphoteric compound containing solution such as disclosed above. For example, the solution could be a 1 to 3 molar ferric nitrate or ferric chloride solution or a 0.5 to 2 molar solution of either birnessite or cryptomelane. Alternatively, the amphoteric solution could be applied directly to the pipe surface by spraying and the like.

The piping could be formed out of conventional concrete or a CPP material such as described above. The CPP piping would most likely be used when the pipe grade was above the water table or placed in soil which could otherwise readily absorb runoff. In this manner, runoff flowing through the water could be at least partially returned to the ground around the run of the pipeline. The CPP piping would typically have a hydraulic conductivity ranging from about 0.001 to about 1.0 cm/sec. Both the CPP piping and conventional concrete piping could have the amphoteric compound introduced in the mixing process prior to the concrete mixture being placed in the pipe forms. It is also in the scope of the present invention to include conventional fired clay piping which has been coated with an amphoteric compound or a specially made clay piping which has had the amphoteric compound added as part of the clay mixture before the pipe is fired.

Another embodiment of the present invention comprises forming a filter by placing an amphoteric compound in a clay liner or in a roadway sub-base. As used herein, the term "sub-base" is intended to include a roadway sub-base formed of clay, silt or sand or a mixture of these materials or recycled materials. This sub-base may be water pervious or impervious. Conventionally, a sub-base is formed by placing a layer of uncompacted soil or recycled material over the area where the sub-base is to be constructed. Water is then added to bring the sub-base to its optimum compacted moisture content. The layer is then compacted to a predetermined density. Typically, this process is carried out in layers or "lifts" as is well known in the art. The optimum compacted moisture content is determined by standard testing procedures such as set out in ASTM D698. An improved sub-base according to the present invention may be constructed by raising the uncompacted sub-base to its optimum compacted moisture content with a solution containing an amphoteric compound. It may not be necessary to add the amphoteric solution to all lifts, but simply the upper most 1 to 3 lifts. Clays have a wide range of SSA values ranging from approximately 15 $m^2/g$ for clays like kaolinite or illite up to approximately 850 $m^2/g$ for clays like sodium montmorrilite. Their large SSA values make clays a highly effective substrate for applying amphoteric compounds.

Another geotechnical structure utilizing amphoteric compounds could be water impervious clay liners. While clay liners are intended to be water impermeable, it is common for liners to have some permeability resulting in water escaping from within the liner into the surrounding soil. If the clay liner is treated with an amphoteric compound, water traveling along the liner (toward the break) or through the liner will have ionic constituents sorbed from it. In a similar manner, some roadways are built with sub-bases which are intended to be water impervious. Generally, it is also not intended to have water flow through the pavement to the sub-base. However, cracking in roadways is commonplace and rainwater migrates through the cracks to the sub-base. If the sub-base retains its water impermeable characteristics, water will flow laterally to the edge of the roadway. If the sub-base is coated with an amphoteric compound, ionic constituents are effectively removed as the water travels along the sub-base toward the edge of the roadway. If the sub-base also forms cracks, water flowing through the sub-base will be treated.

While the foregoing invention has often been described in terms of specific examples, those skilled in the art will recognize many variations which are intended to fall within the scope of the claims. For example, while manganese and iron are two preferred elements for from amphoteric compounds, aluminum is a third element which may be utilized. Furthermore, while the above has described the media as utilized for remove heavy metals from water, the media could be utilized to remove many types of airborne or waterborne ionic constituents. In particular, sand or polyethylene beads filters could readily be adapted to treat flows of air for ionic constituents such as aerosols, charged particulate matter, odors, and gas emissions containing water vapor with anionic or cationic species. All of these variations are intended to come within the scope of the following claim.

The invention claimed is:

1. A porous pavement comprising a cementitious pavement material having a hydraulic conductivity greater than 0.0001 cm/sec and an amphoteric compound-bonded to said porous pavement such that waterborne constituents contained in fluids flowing through said pavement are captured by said amphoteric compound.

2. A porous pavement according to claim 1, further comprising a length and a width, wherein the ratio between said length and said width is less than 20.

3. A porous pavement according to claim 2, wherein said pavement is at least about 6 inches in depth.

4. A porous pavement according to claim 1, wherein said cementitious pavement is formed from a slurry having a water to cement ratio ranging from about 0.14 to about 1.0.

5. A porous pavement according to claim 1, wherein said amphoteric compound comprises at least one oxide of iron, aluminum, manganese, or silicon.

6. A porous pavement according to claim 1, wherein said pavement comprises an alkaline cementitious porous pavement.

7. A porous pavement according to claim 6, wherein said pavement is formed from a slurry having a water to cement ratio ranging from about 0.3 to about 0.5.

8. A porous pavement according to claim 5, wherein said porous pavement is placed on a ground surface so as to be exposed to surface runoff water.

9. A porous pavement according to claim 8, wherein said porous pavement forms a rigid pavement surface or shoulder.

10. A porous pavement according to claim 8, wherein said amphoteric compound comprises at least two oxides of iron, aluminum, manganese, or silicon.

11. A porous pavement according to claim 5, wherein said pavement is placed as a continuous section.

12. A porous pavement according to claim 5, wherein said pavement is formed of pre-cast blocks.

13. A porous pavement according to claim 5, wherein said amphoteric compound comprises at least one oxide of aluminum.

14. A porous pavement according to claim 5, wherein said amphoteric compound comprises at least one oxide of manganese.

15. A porous pavement according to claim 5, wherein said amphoteric compound comprises at least one oxide of silicon.

16. A porous pavement according to claim 8, wherein the waterborne constituents includes a cation.

17. A porous pavement according to claim 16, wherein cation is at least one of Cd, Cu, Zn, Ni, Pb, or Cr.

18. A porous pavement according to claim 1, wherein said amphoteric compound is chosen from at least one compound of iron, manganese, aluminum, or silicon.

19. A porous pavement according to claim 5, wherein said hydraulic conductivity is between about 0.1 and about 0.01 cm/sec.

20. The porous pavement according to claim 5, wherein said pavement has a porosity greater than about 0.10.

21. A porous pavement according to claim 5, wherein said porous pavement consists essentially of a nonasphaltic cementitious pavement material.

22. A porous pavement according to claim 8, wherein fluid flowing across a top of said porous pavement is able to enter said porous pavement to contact said amphoteric compound.

* * * * *